United States Patent
Szafraniec

(10) Patent No.: US 7,466,425 B2
(45) Date of Patent: Dec. 16, 2008

(54) ELEMENTARY MATRIX BASED OPTICAL SIGNAL/NETWORK ANALYZER

(75) Inventor: Bogdan Szafraniec, Sunnyvale, CA (US)

(73) Assignee: Agilent Technologies, Inc., Santa Clara, CA (US)

(*) Notice: Subject to any disclaimer, the term of this patent is extended or adjusted under 35 U.S.C. 154(b) by 425 days.

(21) Appl. No.: 11/112,457

(22) Filed: Apr. 22, 2005

(65) Prior Publication Data

US 2006/0238770 A1  Oct. 26, 2006

(51) Int. Cl.
G01B 11/02 (2006.01)
G01N 21/00 (2006.01)

(52) U.S. Cl. .................................... 356/491; 356/73.1
(58) Field of Classification Search ............ 356/484, 356/73.1, 487, 485, 491, 492
See application file for complete search history.

(56) References Cited

U.S. PATENT DOCUMENTS

| | | | | |
|---|---|---|---|---|
| 6,256,103 B1* | 7/2001 | Sorin et al. | ............... | 356/484 |
| 6,259,529 B1* | 7/2001 | Sorin et al. | ............... | 356/484 |
| 6,535,328 B2* | 3/2003 | Yao | ............... | 359/334 |
| 6,671,056 B2* | 12/2003 | Szafraniec | ............... | 356/484 |
| 6,801,320 B2* | 10/2004 | Szafraniec | ............... | 356/484 |
| 6,977,720 B2* | 12/2005 | Baney et al. | ............... | 356/73.1 |
| 7,019,839 B2* | 3/2006 | Szafraniec | ............... | 356/484 |
| 7,027,743 B1* | 4/2006 | Tucker et al. | ............... | 398/204 |
| 7,075,659 B2* | 7/2006 | Szafraniec | ............... | 356/484 |
| 7,174,107 B2* | 2/2007 | Boroditsky et al. | ......... | 398/152 |
| 2002/0122180 A1* | 9/2002 | Szafraniec | ............... | 356/451 |
| 2004/0070766 A1* | 4/2004 | Szafraniec | ............... | 356/477 |
| 2004/0165192 A1* | 8/2004 | Krause | ............... | 356/491 |
| 2005/0024645 A1* | 2/2005 | Dorrer | ............... | 356/450 |
| 2005/0047706 A1 | 3/2005 | Waagaard et al. | | |
| 2005/0174577 A1* | 8/2005 | Szafraniec | ............... | 356/477 |
| 2005/0232640 A1* | 10/2005 | Boroditsky et al. | ......... | 398/152 |
| 2006/0120733 A1* | 6/2006 | Tucker et al. | ............... | 398/204 |
| 2006/0238770 A1* | 10/2006 | Szafraniec | ............... | 356/477 |
| 2008/0100847 A1* | 5/2008 | Szafraniec | ............... | 356/491 |

FOREIGN PATENT DOCUMENTS

GB  2405469 A  2/2005

OTHER PUBLICATIONS

Search Report Dated: Sep. 28, 2005.

* cited by examiner

*Primary Examiner*—Patrick J Connolly

(57) ABSTRACT

A method for characterizing a device under test includes propagating multiple optical signals through the device under test and combining the multiple optical signals with a reference optical signal. The multiple optical signals are mixed with the reference optical signal and a relative perturbation between the multiple optical signals from the mixing of the multiple optical signals with the reference optical signal is determined. In another embodiment a modulated optical signal is provided from a local oscillator and the modulated optical signal is combined with the input optical signal. The modulated optical signal is mixed with the input signal to provide a mixed signal and at least one polarization-resolved parameter of the input optical signal is extracted from the mixed signal.

9 Claims, 5 Drawing Sheets

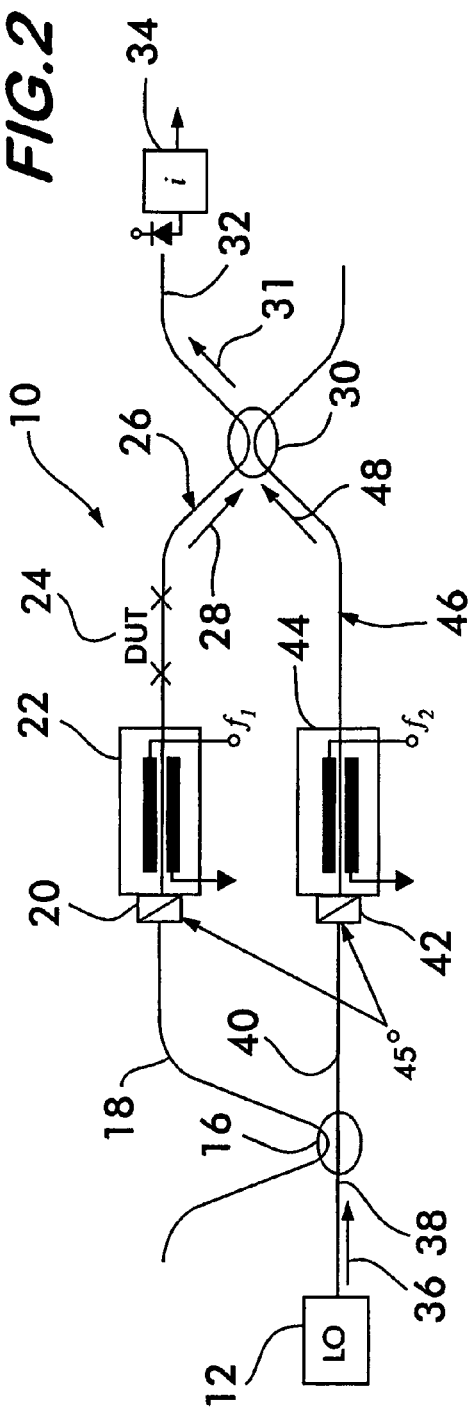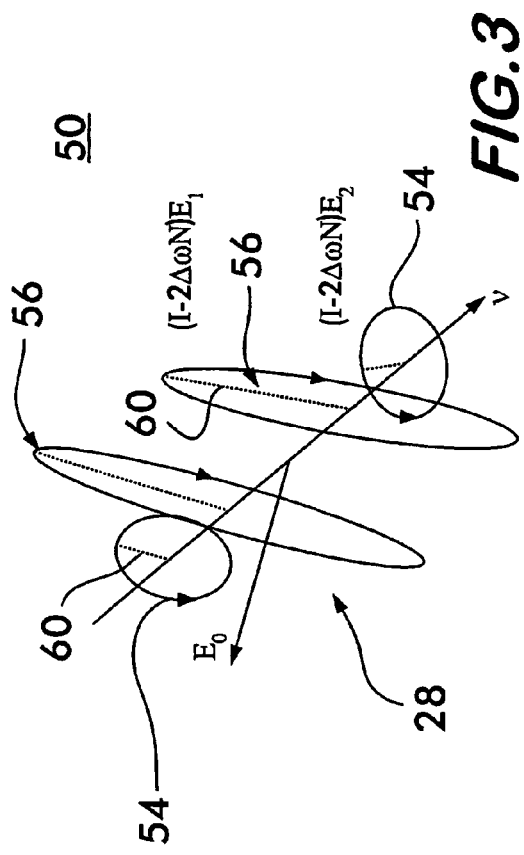

ELEMENTARY MATRIX BASED OPTICAL SIGNAL/NETWORK ANALYZER

BACKGROUND OF THE INVENTION

Electrical network analysis relies on measurements of amplitude and phase (or group delay) of transmitted or reflected electrical signals. For optical networks the measurements can be more complicated due to the polarization states of optical signals within the optical networks. The characterization of optical networks requires a measurement of phase and amplitude, and also a measurement of phase and amplitude dependence on the polarization state. All parameters are typically tested versus optical frequency.

The complexity of the characterization of optical networks has led to the development of multiple instruments that perform a variety of measurements. For example, a tunable laser and a power meter can be used to measure an amplitude response of an optical network. A tunable laser, a polarization controller and a power meter can be used to measure an amplitude dependence on the polarization state, typically quantified by a polarization dependent loss (PDL). The PDL is expressed by a difference between the maximum and the minimum transmission (or reflection).

A tunable laser and polarimeter can be used to directly measure a Jones matrix. Eigen-analysis of Jones matrices provides in turn information about the PDL and a polarization dependence of the group delay often described by a differential group delay (DGD). The DGD is expressed by a difference between the maximum and the minimum group delay. In another technique, often referred to as the phase shift method, an intensity-modulated tunable laser and a high-speed synchronous detector allowed for a direct measurement of the group delay and the amplitude. The phase shift method of measuring dispersion provides a correct estimate of the group delay when the device under test (DUT) does not contain polarization maintaining fiber (linear birefringence). However, in this method, the polarization rotation in the polarization maintaining fiber corrupts the group delay measurements. It is also known in the prior art to obtain most of the foregoing measurements with a single instrument including a tunable laser, an interferometer and a polarization-resolving module that is realized by a polarization diversity receiver or a tunable laser polarization controller. An example of such an instrument is the Agilent 81910A Photonic All-Parameter Analyzer.

However, the analysis techniques using an instrument such as the 81910A Photonic Parameter Analyzer were adapted from techniques used with precursor instruments. For example, the DGD estimation obtained with this type of instrument is based on the Jones matrix eigen-analysis. The PDL estimation is based on the Jones matrix eigen-analysis or on the Mueller matrix method. Furthermore, the amplitude and phase are estimated directly from the phase and amplitude of the detected interferometric signals. Thus, any instabilities of the interferometer or the phase noise of the laser source affect the precision of the measurements. This is particularly inconvenient because of the inherent sensitivity of the measurements to vibration and temperature fluctuations.

BRIEF DESCRIPTION OF THE DRAWINGS

The embodiments of the present invention are described in conjunction with the following drawings in which like reference numerals designate like elements.

FIG. 2 is a simplified schematic diagram of an embodiment of the optical analyzer of the present invention.

FIG. 3 shows a graphical representation of optical waves that are used to interrogate the DUT in the optical analyzer of FIG. 2.

DETAILED DESCRIPTION

Figure 1:
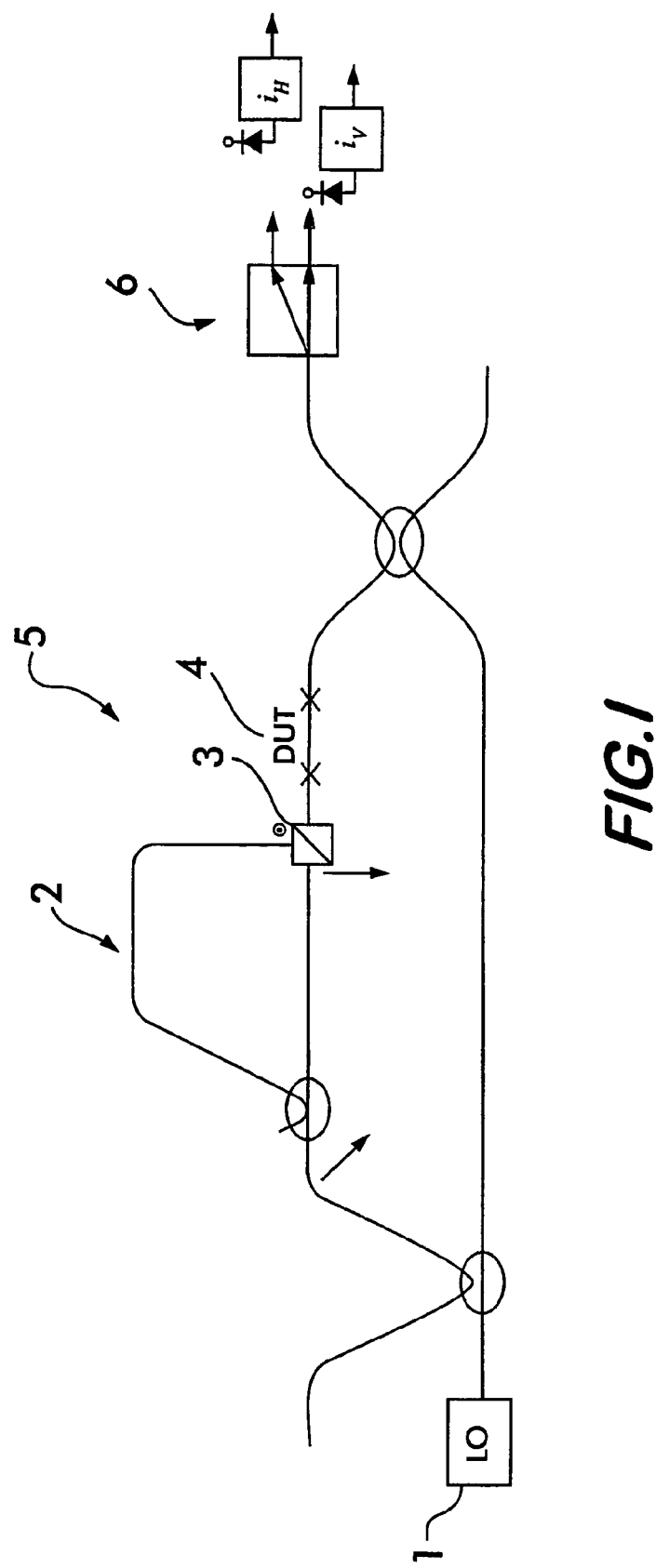
FIG. 1 shows a schematic diagram of a prior art optical analyzer with a polarization delay unit and a polarization diversity receiver.

FIG. 1 shows a prior art optical analyzer 5. Within the optical analyzer 5 an optical wave from a swept local oscillator 1 is split into two optical waves that are propagated through separate paths. The swept local oscillator 1 is continuously tuned over a range selected according to a wavelength of interest. The optical wave propagated through an upper path of the optical analyzer 5 is directed to a DUT 4. The optical wave propagated through a lower path, the local oscillator path, is directed toward the polarization diversity receivers 6. A polarization controller (not shown) in front of the polarization diversity receivers 6 is adjusted to evenly split light from the local oscillator path at the polarization diversity receivers 6.

A polarization delay unit 2 within the upper path of the optical analyzer 5 splits the light from the swept local oscillator 1 propagating through the upper path into two optical waves. One of the optical waves within the polarization delay unit 2 propagates through a delay unit upper path that includes a polarization delay link. The optical wave that propagates through the polarization delay link is delayed by a time τ with respect to the optical wave that propagates through the lower path of the polarization delay unit 2. Additionally, it is know to those skilled in the art that the optical waves propagating through the upper and lower paths of the polarization delay unit 2 can be orthogonally polarized, for example by providing a polarization maintaining fiber within the polarization delay unit 2. The two orthogonally polarized optical waves within the polarization delay unit 2 are recombined in orthogonal polarization states using a polarizing beam combiner 3 in one known prior art embodiment. Splitting and recombining the optical waves provided by the swept local oscillator 1 in this manner creates two optical waves at the output of the polarizing beam combiner 3 that are propagated through the DUT 4. The waves created in this manner have different optical frequencies and approximately orthogonal polarization states.

Within polarization diversity receivers 6, the optical waves from the DUT 4 interfere with the optical wave from the local oscillator path at the polarization diversity receivers 6. FIG. 1 shows the optical waves that are transmitted through the DUT 4, however, another architecture can be provided for the reflected optical waves. Alternatively both architectures can be merged and the respective waves can be detected at a transmission and a reflection receiver, as clear to those skilled in the art.

The frequency, phase and amplitude of the interference signals thus provided are measured at the polarization diversity receivers 6. From this measurement by the polarization diversity receivers 6 the polarization resolved transfer function of the DUT 4 can be determined. In general, using the polarization resolved transfer function of the DUT 4 determined in this manner, the transmissivity, reflectivity, PDL, polarization mode dispersion, group delay and chromatic dispersion of the DUT 4 can be determined. All of the parameters necessary for characterizing the optical properties of the DUT 4 can thus be determined from measurements obtained during a single scan of the local oscillator 164 over the wavelength of interest in accordance using this embodiment. However, even though the prior art optical analyzer 5 can provide satisfactory results in many cases, the analyzer is inherently sensitive to thermal transients and vibration, in addition, it requires the polarization diversity receivers 6 that is expensive and requires proper alignment with the local oscillator.

FIG. 2 shows an optical analyzer 10 according to embodiments of the present invention. The optical analyzer 10 is typically an optical analyzer, an optical signal analyzer, or an elementary matrix-based heterodyne optical analyzer that is suitable for testing the optical properties of a DUT 24. According to the embodiments of the present invention, the optical properties of the DUT 24 can be characterized without the need for polarization diversity receivers such as the polarization diversity receivers 6 shown in the prior art optical analyzer 5 of FIG. 1. Furthermore, the optical signals provided by the DUT 24 can be measured differentially, as described below, to provide immunity to thermal instabilities and vibration.

Within the optical analyzer 10 the DUT 24 is tested using light provided by a local oscillator 12. According to one embodiment, the local oscillator 12 can be a tunable, highly-coherent light source. The local oscillator 12 applies an input optical wave 36 to an input optical link 38. The input optical link 38 could be an optical fiber, such as a polarization maintaining optical fiber. Alternatively, the input optical link 38 could be realized in a free space to provide propagation of the optical wave from the local oscillator 12 to an optical splitter 16. The optical splitter 16 receives the input optical wave 36 and applies waves to the optical links 18, 40. The optical waves within the optical links 18, 40 are applied to the polarizers 20, 42 that provide approximately equal amounts of optical power into two linear polarization modes of the modulators 22, 44. Optical waves in the two linear polarization modes of the modulators 22, 44 are phase modulated differently, which permits polarization modulation of the input optical wave 36. The optical waves within the modulators 22, 44 are modulated at the frequencies $f_1$ and $f_2$, respectively.

Thus, within the optical analyzer 10, a polarizer 20 operates in cooperation with the modulator 22 to provide a modulated optical wave having multiple optical sidebands with different polarization states for transmission to the interferometer DUT arm 26. The modulated optical wave includes multiple optical sidebands that act as multiple optical waves having the same optical phase noise and intensity noise. Applying the output of the modulator 22 having the multiple optical sidebands to the DUT 24 has a similar effect to applying multiple optical waves having frequencies and polarization states that are uniquely defined by the electrical modulation signals. The multiple optical waves 28 propagate through the DUT 24 within an interferometer DUT arm 26, and therefore the multiple optical waves 28 can also be referred to as the DUT optical waves 28 herein. It will be understood by those skilled in the art that the sidebands of the DUT optical waves 28 are perturbed differently by the DUT 24, depending on the optical properties of the DUT 24. The differences in perturbations can be measured to provide a direct indication of elementary perturbations that are described below.

From the output of the DUT 24 the multiple optical waves 28 are transmitted by way of the interferometer DUT arm 26 to a coupler 30. The interferometer DUT arm 26 can be realized by a single mode (SM) fiber. The coupler 30 is typically a fiber optic coupler, such as a SM coupler. Alternatively, bulk optical components can be used instead of fiber optic components. Additionally, the modulated reference optical waves 48 are produced by the modulator 44 operating in cooperation with a polarizer 42 and transmitted from the modulator 44 by way of the reference arm 46 to the coupler 30. The modulated reference optical waves 48 includes one or more optical waves or optical signals having frequencies and polarization states that are uniquely determined by an electrical modulation signal having a frequency $f_2$. The DUT optical waves 28 and the modulated reference optical waves 48 are combined within the coupler 30. The output signal of the coupler 30 is then applied by way of the optical link 32 to the receiver 34 to be detected and mixed. Alternatively, the receiver 34 can contain a polarization diversity receiver as described in more detail below.

The embodiment of the optical analyzer 10 set forth is based on the elementary matrices similar to those introduced by Jones. The elementary Jones matrices describe a direct effect of retardence, birefringence, absorption, and dichroism on the Jones vector, specifically, on the amplitude and the phase of two linear polarization components of the Jones vector. The elementary matrix description is complete and covers all aspects of propagation of an optical wave. As described by Jones the elementary matrices have well defined physical meaning. Alternative perturbations that are mathematically equivalent to those described by Jones can be found by those skilled in the art. For example, any linear combination of the elementary perturbations constitutes another set of perturbations that is mathematically equivalent.

Assume that the Jones matrix $M_\nu$ describes some optical medium at an optical frequency $\nu$. At a slightly different optical frequency $\nu+\Delta\nu$ the Jones matrix differs from the original matrix $M_\nu$ and can be described as $M_{\nu+\Delta\nu}$. Following the derivation by Jones, the new matrix can be described as $M_{\nu+\Delta\nu}=M_{\Delta\nu}M_\nu$, where $M_{\Delta\nu}=I+2\pi\Delta\nu N$, where I is the identity matrix and the matrix N represents some elementary perturbations. The elementary perturbations represented by N are described by the following matrices.

The group delay matrix can be represented as:

$$N_0 = p_0 \begin{pmatrix} -j & 0 \\ 0 & -j \end{pmatrix}, \tag{1}$$

where $p_0$ represents the group delay. The 0° linear birefringence matrix can be represented as:

$$N_1 = p_1 \begin{pmatrix} j & 0 \\ 0 & -j \end{pmatrix}, \tag{2}$$

where $p_1$ represents the 0° component of the differential group delay. The 45° linear birefringence matrix can be represented as:

$$N_2 = p_2 \begin{pmatrix} 0 & j \\ j & 0 \end{pmatrix}, \quad (3)$$

where $p_2$ represents the 45° component of the differential group delay. The circular birefringence matrix can be represented as:

$$N_3 = p_3 \begin{pmatrix} 0 & -1 \\ 1 & 0 \end{pmatrix}, \quad (4)$$

where $p_3$ represents the circular component of the differential group delay. The differential absorption matrix can be represented as:

$$N_4 = p_4 \begin{pmatrix} -1 & 0 \\ 0 & -1 \end{pmatrix}, \quad (5)$$

where $p_4$ represents absorption per unit frequency (the frequency derivative of the absorption). The differential 0° linear dichroism matrix can be represented as:

$$N_5 = p_5 \begin{pmatrix} 1 & 0 \\ 0 & -1 \end{pmatrix}, \quad (6)$$

where $p_5$ represents the 0° component of the polarization dependent loss frequency derivative. The differential 45° linear dichroism matrix can be represented as:

$$N_6 = p_6 \begin{pmatrix} 0 & 1 \\ 1 & 0 \end{pmatrix}, \quad (7)$$

where $p_6$ represents the 45° component of the polarization dependent loss frequency derivative. The differential circular dichroism matrix can be represented as:

$$N_7 = p_7 \begin{pmatrix} 0 & -j \\ j & 0 \end{pmatrix}, \quad (8)$$

where $p_7$ represents the circular component of the polarization dependent loss frequency derivative. The above definitions differ slightly from those presented by Jones. Instead of thin slices of material as presented by Jones, small increments of optical frequency are considered a preferred embodiment of the present invention. Since the net perturbation can be induced by several optical phenomena, it is represented by a sum of the elementary matrices defined above:

$$N = N_0 + N_1 + N_2 + N_3 + N_4 + N_5 + N_6 + N_7. \quad (9)$$

Referring now to FIG. 3, there is shown a graphical representation 50 of the DUT optical waves 28 which are produced at the output of the modulator 22 and applied to the DUT 24 for testing the DUT 24 within the optical analyzer 10. The graphical representation 50 includes a carrier wave $E_0$ which serves as a reference wave and is therefore unperturbed. The DUT optical waves 28 also include multiple pairs of sidebands which are created by the modulator 22, wherein the polarization states of the positive and negative sidebands of a sideband pair are substantially the same. The two pairs of sidebands of the DUT optical waves 28 are referred to as the sideband pairs 54, 56.

The polarization state of each sideband of the sideband pairs 54, 56 is represented by an ellipse within the graphical representation 50. Each ellipse shown in the graphical representation 50 shows two parameters of the polarization state of a sideband. One parameter shown in the graphical representation 50 is the ellipticity of the sidebands as represented by the shape of the ellipse. The other is the azimuth of the sideband as represented by the dotted lines 60.

The positive and negative sidebands for each sideband pair 54, 56 of the DUT optical waves 28 are in nearly the same polarization state. The difference in the polarization state, amplitude and phase between the sidebands of the sideband pairs 54, 56 determines the elementary matrix N. In the graphical representation 50, I is the unitary matrix, $E_i$ represents a Jones vector and $\omega_m = 2\pi v$ represents the angular optical frequency. The frequency of the local oscillator 12 can be represented as v and the modulation sidebands produced by the modulator 22 are separated from v by a multiple of a modulation frequency $\pm nf_m$.

Let us initially assume that the DUT 24 does not affect the propagation of the light transmitted therethrough. In this case the positive and negative sidebands of the sideband pairs 54, 56 have the same polarization state:

$$E_n = \exp(j2\pi vt)(\exp(-jn\omega_m t)P_n + \exp(jn\omega_m t)P_n) \quad (10)$$

where $P_n$ is the Jones vector that describes a polarization state of the ±n sidebands and $\omega m = 2\pi f_m$ is the angular modulation frequency. In considering the perturbations of the sidebands of the DUT optical waves 28 the frequency v of the local oscillator 12 can be chosen as a reference. Thus, the perturbations experienced by the positive and negative sidebands are equal in magnitude and opposite in sign:

$$E_n = \exp(j2\pi vt)(\exp(-jn\omega_m t)(I - n\omega_m N)P_n + \exp(jn\omega_m t)(I + n\omega_m N)P_n) \quad (11)$$

Equation (11) shows that all optical waves that comprise the modulated optical signal and propagate through the DUT 24 can be expressed in terms of the perturbation matrix N. Therefore, by measuring the sideband pairs 54, 56 comprising positive and negative sidebands it is possible to measure the perturbation matrix N. This demonstrates that the direct measurement of the group delay does not require a measurement of the Jones matrix and Jones matrix eigen-analysis. The measurement of the perturbation matrix N defines the method for analyzing an embodiment of the optical of the present invention. Furthermore, the foregoing shows that the formulation of the problem matches the theory of elementary matrices.

The parameters that are measured in this manner include derivatives of phase, i.e., group delay and differential group delay, and derivatives of the amplitude and the PDL. Additionally, it will be understood that within the optical analyzer 10 the measurements between adjacent sidebands are differential. Therefore, the measurements are substantially immune to any phase and amplitude noise present in the local oscillator 12 or induced within the interferometer of the optical analyzer 10. In the preferred embodiment of the optical analyzer 10, all measurements can be performed using an optical heterodyne that involves mixing of modulated DUT optical waves 28 with corresponding modulated reference optical waves 48.

Since the Jones vector consists of two complex numbers, its perturbation is also described be two complex numbers (four real numbers). Thus, for every pair of sideband pairs 54, 56 four perturbations can be measured. In order to determine the eight parameters that describe all of the elementary matrices at least two pairs of sidebands have to be analyzed.

It will be understood by those skilled in the art that measurements of a single pair of sidebands can be sufficient if there are four or fewer than four varying parameters. It will also be understood that the DUT optical waves 28 shown in the graphical representation 50 and the modulated reference optical waves 48 do not both have to originate from the same local oscillator 12. It is sufficient if the electrical modulation signals of the optical waves 28, 48 are locked to the same clock. This allows for measurements of optical networks that are not directly accessible, e.g., the distributed optical networks.

Thus, the optical analyzer 10 can perform the measurements provided by the prior art optical analyzer 5 without the use of polarization diversity receivers such as the polarization diversity receivers 6 of the prior art optical analyzer 5. Furthermore, it will be understood that it is the use of the modulation in the interferometer DUT arm 26 of the optical analyzer 10 that permits such measurements without an inherent sensitivity to thermal instabilities and vibration and without a polarization delay unit 2 as shown in the prior art optical analyzer 5. Also, it will be understood that it is the use of the modulation in the LO arm 46 of the of the optical analyzer 10 that permits such measurements without the use of the polarization diversity receivers 6. Thus, the optical analyzer 10 provides the advantages commensurate with the elimination of the environmental sensitivity (thermal effects and vibration), the elimination of the polarization delay unit, and the elimination of the polarization diversity receivers 6. It will also be understood that the sensitivity of the measurements provided by the optical analyzer 10 can be compromised by environmental factors such as vibration and temperature when only the modulation of the LO optical waves is used.

The optical analyzer 10 in FIG. 2 must provide modulation in the DUT arm to allow differential measurements. The frequency separation between the DUT optical waves 28 has to be large enough to make the perturbation between the sidebands of a pair sufficiently large.

The elimination of the polarization diversity receiver within the optical analyzer 10 is possible because of the modulation within the LO arm 46. The use of the modulation in the interferometer DUT arm 26 is not required if differential measurements are not being performed. For example, in one preferred embodiment of the invention the measurement of the polarization state of the DUT optical waves 28 in the interferometer DUT arm 26 is not differential and thus the interferometer DUT arm 26 does not require modulation.

If the measurements are differential and a polarization diversity receiver such as the polarization diversity receivers 6 is not used, then, the modulations in the LO arm 46 and the interferometer DUT arm 26 are required. The frequency of the modulation in the LO arm 46 has to be sufficiently high to measure the perturbations between the sidebands of a sideband pair. It will be shown below that the DUT sidebands are combined with corresponding LO sidebands that are created by the LO modulation at a similar high frequency. In addition, a low modulation frequency of the LO can allow for elimination of the polarization diversity receiver. A optical analyzer architecture corresponding to the optical analyzer 5 that does not require a polarization diversity receiver and allows for a high and a low frequency modulation of an LO is set forth below as optical analyzer 10.

Figure 4:
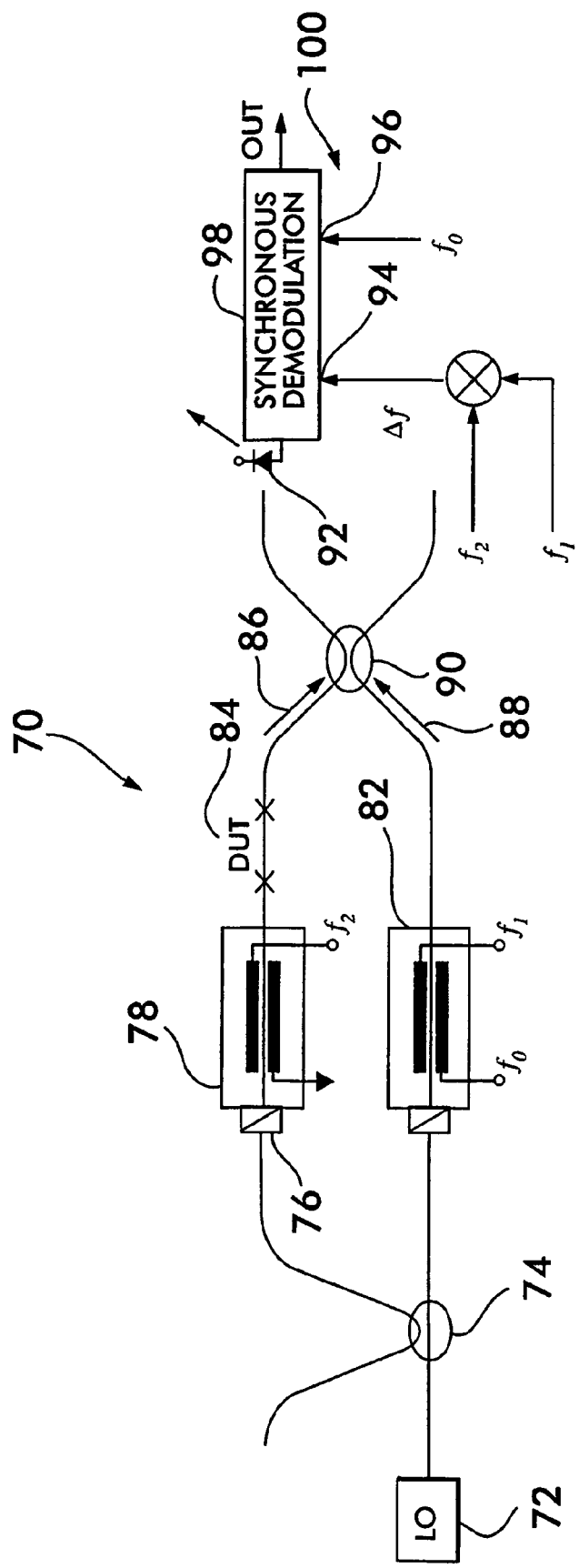
FIG. 4 shows a schematic diagram of an optical analyzer with dual LO modulation and a simplified diagram of a synchronous demodulation.

Referring now to FIG. 4, there is shown an alternate embodiment of the optical analyzer 10 for determining the optical properties of a DUT 84 or any other optical signal at the upper coupler port. The alternative embodiment of the optical analyzer 10 shown in FIG. 4 contains the interferometer 70. As described in more detail below, using the interferometer 70 differential measurements of the optical properties of the DUT 84 can be obtained. The use of differential measurements of the optical properties of the DUT 84, rather than direct measurements, provides decreased sensitivity of the measurements with respect to environmental factors such as vibration and temperature within interferometer 70.

The interferometer 70 includes an input coupler 74, an upper arm containing a modulator 78 and a DUT 84, a lower arm containing a polarization modulator 82, and an output coupler 90. Within the upper arm of the interferometer 70 the multiple optical waves shown in the graphical representation 50 are applied to the DUT 84. The perturbations of the DUT optical waves 86 produced by propagation of the multiple optical waves through the DUT 84 are measured within the interferometer 70 by combining the DUT optical waves 86 with the reference waves 88 and detecting and mixing the resulting combined waves at the detector 92. In a preferred embodiment the detector can be a square-law photodetector.

An input optical wave provided by a local oscillator 72 within the interferometer 70 is split by the input coupler 74 into two optical waves. One of the optical waves produced at the output of the coupler 30 is launched into the modulator 78 by a polarizer 76 and modulated to create multiple optical waves that are propagated through the DUT 84 as previously described. The multiple DUT optical waves 86 of the modulator 78 are in different polarization states. Therefore, the multiple DUT optical waves 86 provided in this manner permit polarization resolved differential measurements of amplitude and phase. Propagation through the DUT 84 perturbs the DUT optical waves 86. The perturbations are measured within the interferometer 70 as mentioned above.

In a preferred embodiment of the interferometer 70, the modulator 78 is realized from a LiNbO$_3$ phase modulator whose electro-optic coefficients are different for two linear polarization modes TE and TM. However, any other optical modulator that creates multiple optical waves in different polarization states is suitable for this application. Two linear polarization modes are launched into the modulator 78 by the polarizer 76 oriented at approximately 45° with respect to the birefringence axes of the modulator 78. The multiple optical waves 86 that result from the sinusoidal phase modulation are described by the Jacobi-Anger expansion:

$$\exp(ja\cos\theta) = \sum_{m=-\infty}^{\infty} j^m J_m(a)\exp(jm\theta), \qquad (12)$$

where j is an imaginary number equal to $\sqrt{-1}$. The polarization states that are created in the upper arm of the interferometer 70 are found from expansion (12) by assuming that modulation indices for two linear polarization modes are not the same. The polarization states are described by the Jones vectors:

$$P_i = \begin{pmatrix} J_i(a_2) \\ J_i(b_2) \end{pmatrix}, \quad (13)$$

where $a_2$ and $b_2$ are the modulation depths for the two linear polarization modes TE and TM, respectively.

The lower arm of the interferometer 70 contains a set of reference optical waves 88 which are created by the modulator 82 from the optical wave provided by the local oscillator 72. The modulator 82 creates the set of reference optical waves 88 by polarization modulation of the signal from the optical local oscillator 72. The electrical modulation signals that are applied to the modulator 82 have frequencies $f_0$ and $f_1$. In one preferred embodiment of the invention two electrical modulation signals at the electrical frequencies $f_0$, $f_1$ can be summed prior to applying them to the modulator 82. Alternatively, they can be applied to different electrodes of the modulator 82 as symbolically shown in interferometer 70. It will be understood that modulating the local oscillator optical wave propagating through the modulator 82 in this manner results in the set of reference waves 88 containing a substantially large number of optical waves.

The additional modulation at the frequency $f_0$ and the resulting creation of the set of reference waves 88 within the interferometer 70 eliminates the need for a polarization diversity receiver that can be used as the receiver 34 in the optical analyzer 10 of FIG. 2. When the receiver 34 of the optical analyzer 10 is a polarization diversity receiver is can be referred to as the polarization diversity receiver 34. The signals from two physically different detectors that are observed in the polarization diversity receiver 34 are synthesized therein from different polarization components of the modulated signal from the local oscillator 72. Thus, the function of the polarization diversity receiver 34 can be realized through the modulation of the LO optical wave in the reference interferometer arm. The DUT optical waves 86 and the set of reference optical waves 88 in the interferometer 70 are combined in the optical coupler 90 and detected by the photodetector 92 in order to provide electrical signals corresponding to the optical waves 86, 88.

The electrical signal output of the photodetector 92 is amplified and synchronously detected by the demodulator 98 within the synchronous demodulator system 100. The synchronous detection performed by the demodulator 98 is a dual synchronous detection. The first synchronous detection of the demodulator 98 is at the frequency difference $\Delta f = f_1 - f_2$ wherein the frequency difference reference signal is supplied to the demodulator 98 at the demodulator port 94. The second synchronous detection is at the frequency $f_0$, wherein the reference signal at the frequency $f_0$ is supplied to the demodulator 98 at the demodulator port 96.

Figure 5:
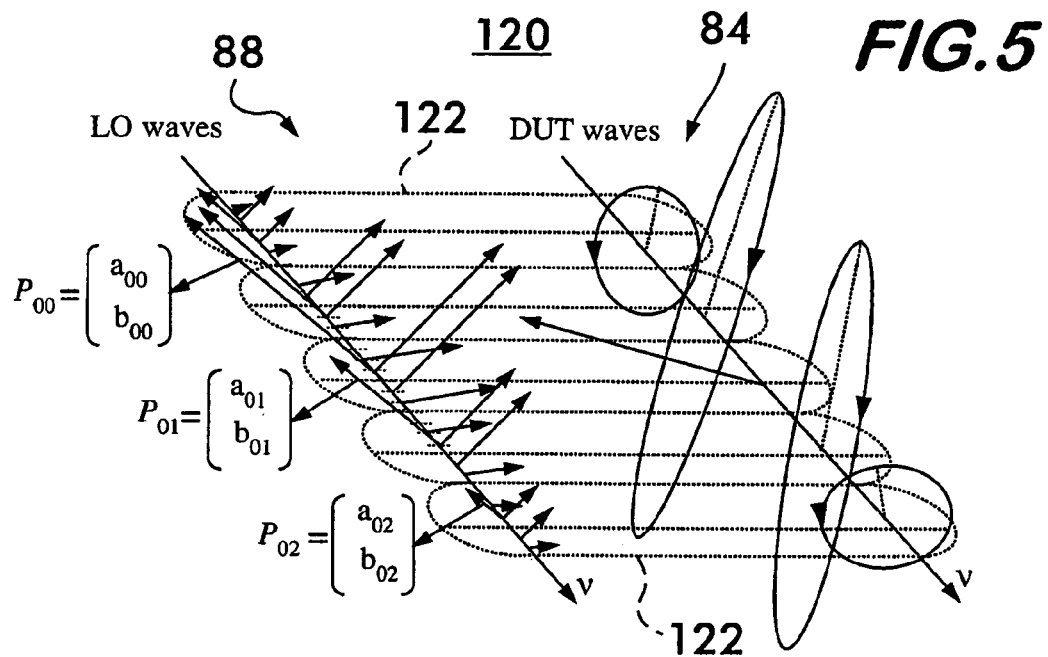
FIG. 5 shows an exemplary graphical representation of optical waves that propagate within the DUT arm and the LO arm of the interferometers that comprises the optical analyzer of FIG. 4.

Referring now to FIG. 5, there is shown the graphical representation 120. The graphical representation 120 includes a graphical representation of the DUT optical waves 86 and a graphical representation of the reference optical waves 88. The optical waves 86, 88 are shown on axes that represent the optical frequency $v$, thus, the separation between the optical waves indicates their different optical frequencies. The reference optical waves 88 which propagate through the lower arm of the interferometer 70 have polarization states described by the Jones vectors $$\begin{pmatrix} g_{ik} \\ h_{ik} \end{pmatrix},$$

wherein:

$$g_{ik} = J_i(a_1) J_k(a_0)$$

$$h_{ik} = J_i(b_1) J_k(b_0). \quad (14)$$

In the above equation, $a_0$ and $b_0$ denote the modulation depths at the frequency $f_0$ while $a_1$ and $b_1$ denote the modulation depths at the frequency $f_1$. Thus, the graphical representation 120 shows a preferred arrangement of the DUT optical waves 86 and a possible arrangement of the reference optical waves 88 that are interfered and detected in corresponding groups. The corresponding groups are shown by oval shapes 122 that connect the DUT optical waves 86 and the respective reference optical waves 88.

As discussed earlier each of the DUT optical waves 86 that is propagated through the DUT 84 can be altered in eight different ways. The eight ways of altering the DUT optical waves 86 can be described by the eight elementary matrices. This defines the eight degrees of freedom that are possible when the DUT optical waves 86 are perturbed. The eight degrees of freedom are: dispersion (1), polarization dispersion (3), amplitude dispersion (1) and amplitude polarization dispersion (3). The DUT optical waves 86 propagating through the DUT 84 are perturbed in accordance with these eight degrees of freedom. The eight elementary perturbations are represented by the elementary perturbation matrix N as shown in Equation (9).

Sinusoidal modulation of the local oscillator optical wave by the modulator 82 at the frequency $f_1$ and at the frequency $f_0$ creates the set of reference optical waves 88 of the interferometer 70. This dual modulation of the local oscillator optical wave creates the set of reference optical waves 88 at the frequencies $v \pm i f_1 \pm j f_0$ where $v$ is an optical frequency, and i and j are integers. This dual modulation provided by the modulator 82 produces optical wave sets within the set of reference optical waves 88 for interference with the corresponding DUT optical waves 86 as shown in the oval shapes 122 of the graphical representation 120. The reference optical wave sets also provide for polarization diversity, i.e., they permit interaction between the DUT optical waves 86 of an arbitrary polarization state with the reference optical waves 88 independently of that polarization state. Thus, as mentioned above, the modulation of the local oscillator signal within the interferometer 70 replaces the function of the polarization diversity receiver 34 within the optical analyzer 10.

The modulation frequency $f_1$ is chosen to be close to the modulation frequency $f_2$. This ensures the selective interaction of the DUT optical waves 86 and the reference optical waves 88 that are shown together within the oval shapes 122 in the graphical representation 120. For example, in one preferred embodiment of the optical analyzer the electrical frequencies $f_1$ and $f_2$ can be between 100 MHz and 2 GHz and the frequency difference $\Delta f = f_1 - f_2$ can be between 10 kHz and 2 MHz. The frequency $f_0$, for example, can be between 1 kHz and 200 kHz. The modulation signal at the frequency $f_0$ provides for the polarization diversity.

Thus, each DUT optical waves 86 that propagates through the DUT 84 has its own set of reference waves within the reference optical waves 88 as show in FIG. 5, where the oval shapes 122 of the graphical representation 120 indicate the corresponding sidebands of the DUT optical waves 86 and the reference optical waves 88 as previously described. Each set of waves within the reference optical waves 88 is used to measure the polarization state of the corresponding pair of the sidebands of the DUT optical waves 86 and to measure the perturbation between the positive and negative sidebands of a sideband pair. The measurement is performed after the optical waves 86, 88 are combined within the optical coupler 90 of the interferometer 70 and mixed at the photodetector 92. The frequencies of the detected electrical signals are $\gamma\tau \pm i\Delta f \pm j f_0$, where $\gamma$ is the sweep rate of the tunable local oscillator 72, and $\tau$ is the free spectral range of the interferometer 70. The details of the signal processing required to detect the electrical signals within the receiver 100 are described below.

Figure 6:
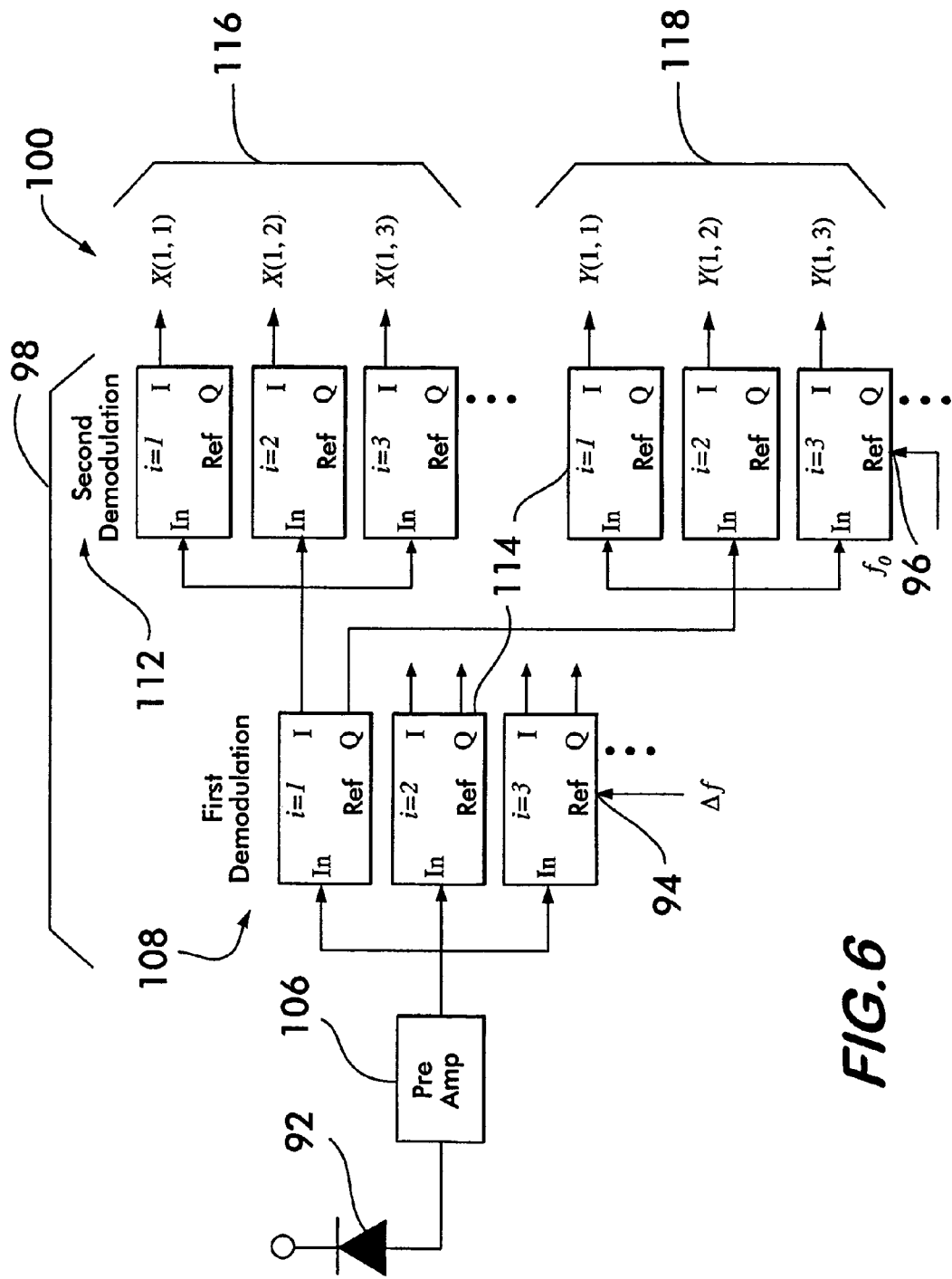
FIG. 6 shows details of a synchronous demodulator from FIG. 4 suitable for use with the optical analyzer.

Referring now to FIG. 6, there is shown a more detailed block diagram representation of the synchronous demodulator system 100 for use within the interferometer 70 an embodiment of the present invention. The optical signal at the output of the optical coupler 90, including the DUT optical waves 86 and the LO reference waves 88, is received and detected by the photodetector 92. The power-law photodetection of the photodetector 92 results in the mixing of the optical waves 86, 88. Thus, the electrical signals have electrical frequencies that correspond to the frequency difference between the corresponding optical waves 86, 88 shown in the oval shapes 122 of the graphical representation 120. The electrical signals from the photodetector 92 are amplified to the desired level by a preamplifier 106. The amplified signals are then synchronously demodulated by the synchronous demodulator 98. The first demodulation within the dual demodulation method of the preferred embodiment is performed by the first demodulation stage 108 and the second demodulation is performed by the second demodulation stage 112. Each demodulation block 114 of the synchronous demodulator 98 has a signal input, a reference input, and two outputs I and Q which denote the in-phase demodulated signal and the quadrature demodulated signal, respectively. The synchronous demodulation is performed in a manner known to those skilled in the art. It is analogous, for example, to the operation of a classical lock-in amplifier. The synchronous detection can be realized in hardware or in software.

The synchronous demodulator 98 provides at its outputs the in-phase signals 116 and the quadrature signals 118. The signals 116, 118 are produced at the outputs of the blocks 114 in the second stage of the synchronous demodulator 98. The in-phase signals 116 are demodulated by the second demodulation stage 112 from the in-phase outputs of the first demodulation stage 108. Similarly, the quadrature signals 118 are demodulated from the quadrature outputs of the first demodulation stage 108. As well known to those skilled in the art the in-phase demodulated signals 116 are in-phase with the provided reference signal and the quadrature demodulated signals 118 are 90° out of phase with respect to the reference signal. The first demodulation stage 108 receives the reference signal at the frequency $\Delta f$ at the demodulator port 94, the second demodulation stage receives the reference signal at the frequency $f_0$ at the demodulator port 96.

As shown below the demodulated in-phase signals X(i,j) 116 describe the polarization state, while the demodulated quadrature signals Y(i,j) 118 are linearly related to the perturbation parameters $p_i$. Thus, the quadrature demodulation of the quadrature signals Y(i,j) 118 describes the perturbations related to eight elementary matrices.

To further describe the operation of the optical analyzer including the interferometer 70 shown in FIG. 4 let us consider one of the DUT optical waves 86 whose polarization state is described by the following Jones vector:

$$E_d = \begin{pmatrix} c \\ s\exp(j\varphi) \end{pmatrix}, \quad (15)$$

where $c=\cos(\alpha)$, $s=\sin(\alpha)$, and $\alpha$ and $\varphi$ are angles (parameters) that uniquely describe a polarization state. The DUT optical waves 86 whose polarization states are described by Equation (15) are combined with the local oscillator optical waves 88 whose polarization states are described by Equation (14) in the coupler 90 of the interferometer 70 and detected by the photodetector 92. After amplification by the amplifier 106 the received electrical signals are synchronously demodulated by the synchronous demodulator 98 as previously described. The in-phase signals 116 at the output of the synchronous demodulator 98 are described by $$X(i,j) = h_{ij}c\cos(\theta - j\pi/2) + g_{ij}s\cos(\theta + \varphi - j\pi/2), \quad (16)$$

where $g_{ij}=J_i(a_1)J_j(a_0)$, $h_{ij}=J_i(b_1)J_j(a_0)$, $\theta=2\pi\gamma\tau t$, $\gamma$ is the sweep rate of the swept local oscillator 72, $\tau$ is the interferometer free spectral range, i describes a sideband related to the modulation at the frequency $f_1$ within the modulator 82, and j describes a sideband related to the modulation at the frequency $f_0$ within the modulator 82. Thus, for known modulation depths $a_{0,1}$ and $b_{0,1}$ the coefficients $g_{ij}$ and $h_{ij}$ are also known and Equations (16) can be solved for c, s and $\varphi$. This uniquely determines polarization state of Equations (15) as understood by those skilled in the art.

As previously described the optical waves 86 that propagate through the DUT 84 in a polarization states defined by Equation (15) are perturbed by the DUT 84 to produce the DUT optical waves 86. The perturbations are opposite for a positive and a negative sideband of the DUT optical waves 86 as described by Equation (11). A complete knowledge of the perturbation lies in determination of elementary matrix coefficients $p_0, \ldots, p_7$. The quadrature outputs Y(i,j) directly depend on these coefficients. For example, in accordance with the foregoing the quadrature output Y(1, 1) can be easily determined by one skilled in the art as:

$$\begin{aligned} Y(1,1) = &(g_{11}c\sin(\theta) + h_{11}s\sin(\theta+\varphi))p_0 \\ &(-g_{11}c\sin(\theta) + h_{11}s\sin(\theta+\varphi))p_1 \\ &(-h_{11}c\sin(\theta) - g_{11}s\sin(\theta+\varphi))p_2 \\ &(h_{11}c\cos(\theta) - g_{11}s\cos(\theta+\varphi))p_3 \\ &(-g_{11}c\cos(\theta) - h_{11}s\cos(\theta+\varphi))p_4 \\ &(g_{11}c\cos(\theta) - h_{11}s\cos(\theta+\varphi))p_5 \\ &(h_{11}c\cos(\theta) + g_{11}s\cos(\theta+\varphi))p_6 \\ &(-h_{11}c\sin(\theta) + g_{11}s\sin(\theta+\varphi))p_7 \end{aligned} \quad (17)$$

Thus, an embodiment of the system and method of the invention can determine all of the elementary parameters $p_i$ from the quadrature signals 118 Y(i,j) provided at the output of the synchronous demodulator 98.

Figure 7:
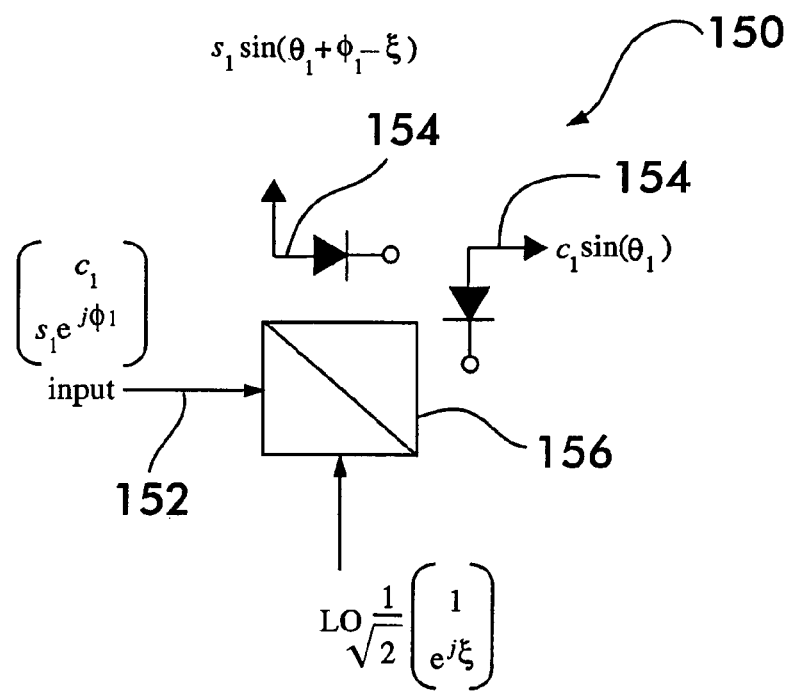
FIG. 7 shows a schematic representation of a polarization diversity receiver that may be used in the optical analyzer of FIG. 4.

Referring now to FIG. 7, there is shown a polarization diversity receiver 150 that can be used in the optical analyzer 10 of FIG. 2. The operation of the polarization diversity receiver 150 is well known to those skilled in the art. The polarization diversity receiver 150 includes a polarizing splitter/combiner 156 and two photodetectors 154 that receive light in orthogonal linear polarization states. The polarization state of the local oscillator 72 is selected to provide approximately equal power at the photodetectors 154. This occurs, for example, when linearly polarized light is positioned at 45° with respect to the axes of the polarizing beam splitter 156. Applying approximately equal local oscillator signal power to both photodetectors 154 ensures the detection of both polarization states of the input optical wave that is resolved by the polarizing beam splitter 156 into two optical waves in linear orthogonal polarization states. Thus, the linear horizontal component of the input optical wave, $c_i$, is detected at one of the photodetectors 154 while the linear vertical component, $s_i \exp(j\phi_i)$, is detected at the other photodetector 154. The amplitudes of the detected electrical signals are proportional to $c_i$ and $s_i$. The phase shift between two detected signals is a measure of the polarization parameter $\phi_i$.

The polarization diversity receiver 150 can replace the multiple optical waves 28 of the optical analyzer 10 in FIG. 2. It provides two output signals that correspond to two orthogonal polarization states. Use of the polarization diversity receiver 150 is not required in the optical analyzer in FIG. 4 since the function of the polarization diversity receiver 150 is performed by the second modulation of the local oscillator reference wave 88 within the modulator 82. Thus, the polarization diversity function can be realized through modulation of the local oscillator signal.

Thus, an embodiment of the optical analyzer of the present invention and the method for using the analyzer can provide a differential measurement between modulation-induced optical waves that are transmitted through or reflected from the device under test (DUT). The relative differences are measured in terms of the elementary Jones matrices. This provides a direct measurement of a group delay and three polarization components of a differential group delay without Jones matrix eigen-analysis. Furthermore, the method provides the frequency derivative of the amplitude and the frequency derivatives of three polarization components of the PDL. All eight parameters are determined at the same time from a single self-consistent algorithm. The embodiment of optical analyzer of the present invention is to the first order immune to optical phase instabilities, thus, immune to environmental instabilities (vibration and temperature) due to its differential nature. Furthermore, the group delay can be measured in the presence of the optical phase noise that originates in the tunable laser or is induced within the interferometer. Similarly, the measured derivatives of amplitude are insensitive to the intensity fluctuations that originate in the tunable laser or are induced within the interferometer. In addition, an embodiment of the method presented in this invention allows a measurement of a dispersive DUT that is also birefringent as the group delay and the differential group delay are separable.

It will be appreciated that in one preferred embodiment of the present invention a method is provided for analyzing optical properties. The method includes providing multiple optical signals and propagating the multiple optical signals through a device under test to determine relative perturbations of the multiple optical signals. The perturbations between the multiple optical signals are determined from the combined electrical signal after detection. The optical properties of the device under test are determined from the relative perturbations. Furthermore, one preferred embodiment of the invention includes a method of modulating a local oscillator that can replace a polarization diversity receiver.

While the embodiments of the invention have been described in detail and with reference to specific examples thereof, it will be apparent to one skilled in the art that various changes and modifications can be made therein without departing from the spirit and scope thereof.

What is claimed is:

1. A method for characterizing a device under test, comprising:
    propagating multiple optical signals through the device under test, the multiple optical signals including multiple sideband pairs, each sideband pair having a positive sideband and a negative sideband, and the positive sideband and the negative sideband of a particular sideband pair having a substantially same polarization state;
    combining the multiple optical signals with a reference optical signal;
    mixing the multiple optical signals with the reference optical signal; and
    for each of at least one sideband pair, determining a relative perturbation between the positive sideband and the negative sideband of the sideband pair, from the mixing of the multiple optical signals with the reference optical signal.

2. The method of claim 1, further comprising determining at least one elementary parameter from the determined relative perturbation, the at least one elementary parameter including at least one of the following:
    a group delay, a 0° component of the differential group delay, a 45° component of the differential group delay, a circular component of the differential group delay, an absorption change per unit frequency, a frequency derivative of a 0° component of the polarization dependent loss, a frequency derivative of a 45° component of the polarization dependent loss, and a frequency derivative of a circular component of the polarization dependent loss.

3. The method of claim 1, wherein different sideband pairs have different polarization states.

4. The method of claim 1, further comprising modulating an optical signal to create the multiple optical signals.

5. The method of claim 1, further comprising:
    providing a local oscillator signal; and
    modulating the local oscillator signal to provide a set of at least one reference optical signal.

6. The method of claim 5, wherein the set of at least one reference optical signal includes a plurality of reference optical signal pairs, and wherein the mixing of the multiple optical signals with the reference optical signal includes mixing the multiple sideband pairs with corresponding ones of the reference optical signal pairs.

7. The method of claim 5, further comprising providing first sinusoidal modulation of the local oscillator signal.

8. The method of claim 7, further comprising providing second sinusoidal modulation of the local oscillator signal.

9. The method of claim 5, wherein the set of at least one reference optical signals includes a plurality of reference optical signal pairs having different polarization states.

* * * * *